United States Patent
Moon

(10) Patent No.: US 7,870,315 B2
(45) Date of Patent: Jan. 11, 2011

(54) METHOD AND APPARATUS FOR MANAGING DATA OF A PORTABLE DEVICE USING A VIRTUAL DEVICE FOR THE PORTABLE DEVICE, AND A USER INTERFACE METHOD USING THE SAME

(75) Inventor: Hong-seok Moon, Incheon Metropolitan (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 99 days.

(21) Appl. No.: 11/602,992

(22) Filed: Nov. 22, 2006

(65) Prior Publication Data

US 2007/0174520 A1   Jul. 26, 2007

(30) Foreign Application Priority Data

Jan. 23, 2006   (KR) ...................... 10-2006-0006803

(51) Int. Cl.
| | |
|---|---|
| G06F 13/12 | (2006.01) |
| G06F 13/38 | (2006.01) |
| G06F 15/16 | (2006.01) |
| G06F 11/00 | (2006.01) |
| G06F 7/00 | (2006.01) |

(52) U.S. Cl. .................. 710/62; 709/217; 709/218; 709/219; 714/6; 707/618; 707/617; 707/654; 707/610; 707/656

(58) Field of Classification Search ................ 710/62; 709/217, 218, 219; 714/6; 707/617, 618, 707/610, 611, 654, 656
See application file for complete search history.

(56) References Cited

U.S. PATENT DOCUMENTS

| | | | |
|---|---|---|---|
| 6,549,917 B1* | 4/2003 | Pollard et al. | 707/201 |
| 2003/0191827 A1* | 10/2003 | Piispanen et al. | 709/221 |
| 2006/0064470 A1* | 3/2006 | Sargent et al. | 709/219 |

FOREIGN PATENT DOCUMENTS

KR   2003-10132   2/2003

* cited by examiner

Primary Examiner—Chun-Kuan Lee
Assistant Examiner—Farley J Abad
(74) Attorney, Agent, or Firm—Jefferson IP Law, LLP

(57) ABSTRACT

A method and apparatus for managing data to be stored in a memory of a portable device, and a user interface method using the same. The method includes generating a virtual device for the portable device in a storage unit of a data management apparatus; storing information on at least one content file, which is used to transmit the at least one content file to the virtual device, in the virtual device; and if the portable device is connected to the data management apparatus, synchronizing the portable device with the virtual device by transmitting the at least one content file to the portable device with reference to the information stored in the virtual device.

32 Claims, 9 Drawing Sheets

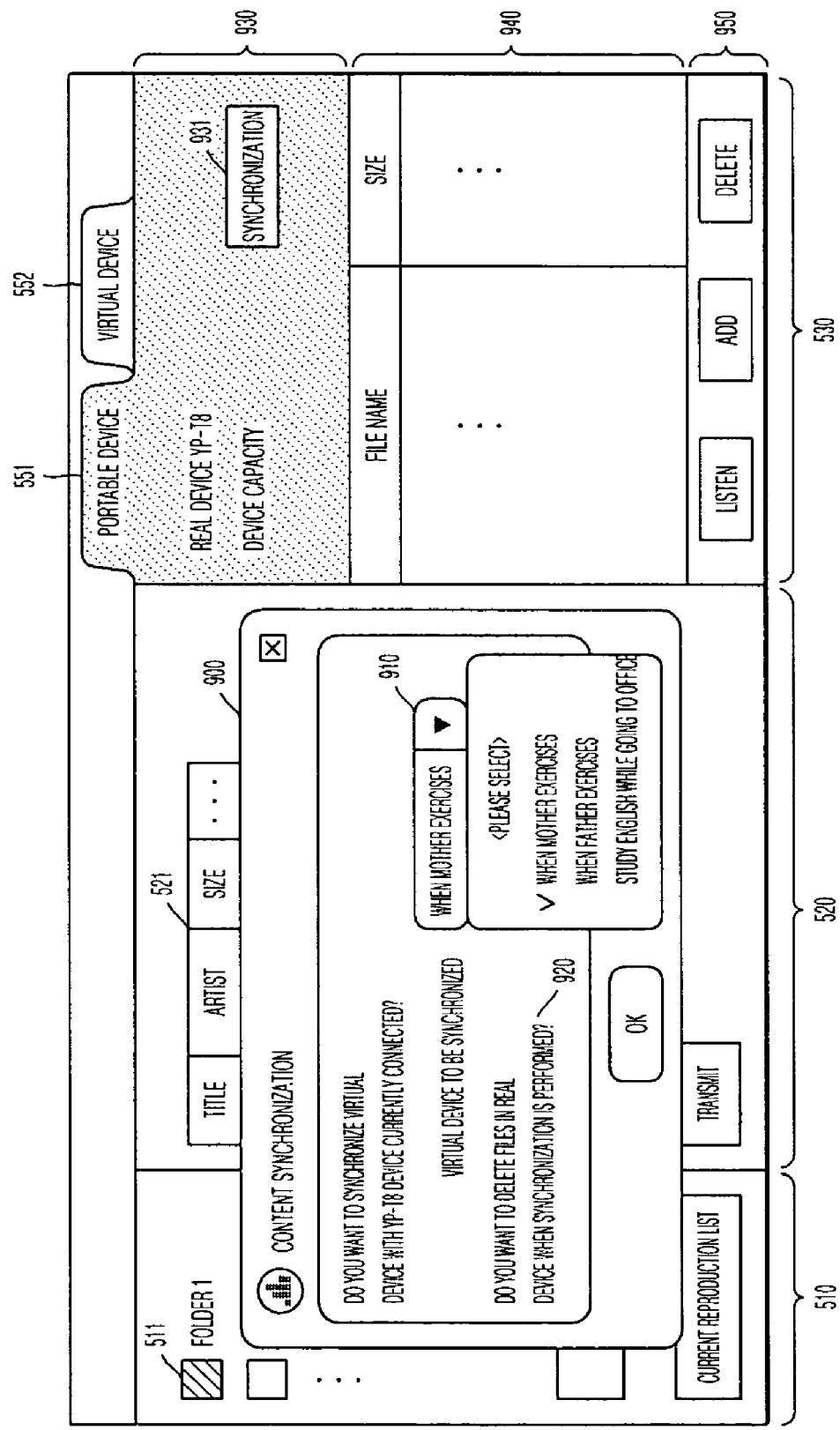

METHOD AND APPARATUS FOR MANAGING DATA OF A PORTABLE DEVICE USING A VIRTUAL DEVICE FOR THE PORTABLE DEVICE, AND A USER INTERFACE METHOD USING THE SAME

CROSS-REFERENCE TO RELATED PATENT APPLICATION

This application claims the benefit of Korean Application No. 2006-6803, filed Jan. 23, 2006, in the Korean Intellectual Property Office, the disclosure of which is incorporated herein in its entirety by reference.

BACKGROUND OF THE INVENTION

1. Field of the Invention

Aspects of the present invention relate to a method and apparatus of managing data to be stored in a memory of a portable device, and a user interface method using the same.

2. Description of the Related Art

Recently, portable devices such as MP3 players, portable multimedia players (PMPs), portable media centers (PMCs), camcorders, digital cameras, cellular phones, and portable personal computers (PCs) have become widely used. To transmit data to portable devices, a method of transmitting data that is stored in a hard disk of a PC, in a state where the PC is connected to the portable device, is generally used.

However, according to the related art, since data of a portable device may be managed only in a state where the portable device is connected to a PC, when a large multimedia file is being copied, the portable device cannot be used conveniently. For example, if the large multimedia file must be converted to a data format that is reproducible by the portable device, an even longer time is required to transmit the large multimedia file. This makes using the device inconvenient. In addition, it is difficult for a user of portable device user who is not adept at operating a PC to connect a portable device to the PC and to execute a management program in the PC every time the user wants to receive a new content file in the portable device or every time the user wants to delete a stored content file from the portable device. When a plurality of users use a single portable device, every time a user is changed, the changed user may delete content files stored by another user in the portable device and newly receive desired content files. This is an inefficient situation.

SUMMARY OF THE INVENTION

Aspects of the present invention provide a method and apparatus for efficiently managing data of a portable device without directly connecting the portable device to a device managing the data of the portable device, and a user interface method using the same.

According to an aspect of the present invention, there is provided a method of managing data of a portable device, the method comprising: generating a virtual device for the portable device in a storage unit of a data management apparatus; transmitting at least one content file to the virtual device by storing information on the at least one content file in the virtual device; and if the portable device is connected to the data management apparatus, synchronizing the portable device with the virtual device by transmitting the at least one content file to the portable device with reference to the information stored in the virtual device.

The generating of the virtual device may comprise assigning a storage area for the virtual device to the storage unit of the data management apparatus.

The generating of the virtual device may further comprise storing in the storage area for the virtual device a model name of the portable device, the maximum capacity of the virtual device, and a name of the virtual device.

The synchronizing of the portable device with the virtual device may comprise: if the portable device is connected to the data management apparatus, displaying a list of virtual devices having the same model name as the model name of the portable device; a user selecting a virtual device to be synchronized from the virtual device list; and storing at least one content file belonging to the selected virtual device in a storage unit of the portable device.

The generating of the virtual device may comprise generating a database for the virtual device, and the transmitting of the at least one content file to the virtual device may comprise storing information on the at least one content file to be transmitted in the database.

The generating of the virtual device may comprise generating a folder for the virtual device, and the transmitting of the at least one content file to the virtual device may comprise storing information on the at least one content file to be transmitted in the folder.

The storing of the information on the at least one content file to be transmitted in the folder may comprise generating at least one link file including a storage location of each of the at least one content file to be transmitted and storing the generated at least one link file in the folder.

The transmitting of the at least one content file to the virtual device may comprise: if a data format of the at least one content file to be transmitted is not supported by the portable device, converting the at least one content file to be transmitted to a data format, which is supported by the portable device; and storing information on the converted file in the virtual device.

The synchronizing of the portable device with the virtual device may comprise: checking a pre-set synchronization type; if the synchronization type is 'replace', deleting data stored in the storage unit of the portable device and storing the at least one content file belonging to the virtual device in the storage unit of the portable device, and if the synchronization type is 'add', additionally storing the at least one content file belonging to the virtual device in the storage unit of the portable device.

The generating of the virtual device may comprise generating a plurality of virtual devices for the portable device, and the synchronizing of the portable device with the virtual device may comprise storing at least one content file belonging to a default virtual device among the plurality of virtual devices in the storage unit of the portable device.

According to another aspect of the present invention, there is provided an apparatus for managing data of a portable device, the apparatus comprising: a communication unit to transmit and/or receive data with the portable device; a storage unit to store a plurality of content files and at least one virtual device for the portable device; and a control unit comprising a virtual device management unit to generate a virtual device in the storage unit and to manage the generated virtual device, a file management unit to transmit at least one content file from the storage unit to the virtual device and to manage the at least one transmitted content file, and a synchronization unit to synchronize the portable device with the virtual device via the communication unit.

The storage unit may further store information on a default virtual device, and the synchronization unit may transmit content files belonging to a virtual device corresponding to the default virtual device to the portable device when the portable device is connected to the apparatus.

The virtual device management unit may generate a virtual device to which a storage area storing a model name of the portable device, the maximum capacity of the virtual device, and a name of the virtual device are assigned when a virtual device generation command is input.

The virtual device management unit may delete information on a selected virtual device from the storage unit when a virtual device deletion command is input and replace information on the selected virtual device stored in the storage unit with information input when a virtual device replacement command is input.

According to another aspect of the present invention, there is provided a user interface method to generate a virtual device, which stores information on a portable device and information on at least one content file, in a storage unit of a data management apparatus and managing data of the portable device using the virtual device, the user interface method comprising if a user selects at least one content file from a content file list displayed on a screen, automatically displaying a quick button connected to a predetermined function corresponding to properties of the content file list, wherein if the displayed content file list is a list of content files stored in the storage unit of the data management apparatus, the quick button is used to transmit information on the at least one selected content file to a virtual device selected from the screen.

If the displayed content file list is a list of content files included in a reproduction list set by the user, the quick button may be used to reproduce the at least one selected content file.

If the displayed content file list is a list of content files stored in a content server connected to the data management apparatus via a network, the quick button may be used to purchase the at least one selected content file.

The user interface method may further comprise displaying the portable device and the virtual device to be identified on the screen.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 9 illustrates a screen to allow for a synchronization of a virtual device and a portable device according to the embodiment of FIG. 5.

DETAILED DESCRIPTION OF THE EMBODIMENTS

Figure 1:
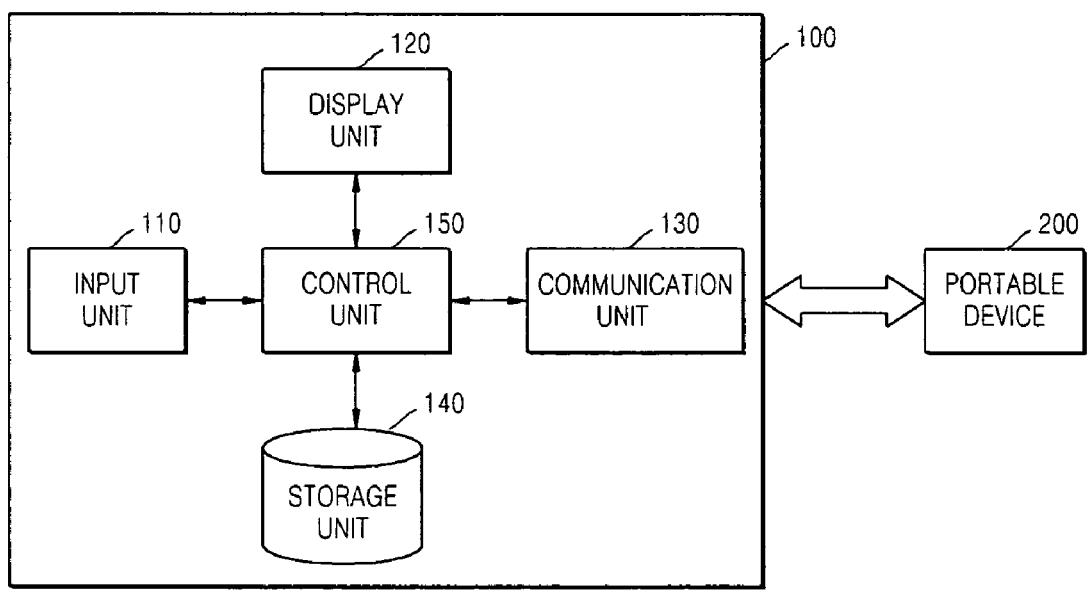
FIG. 1 is a block diagram of an apparatus for managing data of a portable device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus 100 to manage data of a portable device 200 according to an embodiment of the present invention. As shown in FIG. 1, the data management apparatus 100 is a computing device such as a PC and includes an input unit 110 to receive a user command, a display unit 120 to display a user interface, a storage unit 140 to store a plurality of content files and at least one virtual device corresponding to the portable device 200, and a control unit 150 to manage the at least one virtual device and the plurality of content files and to control data synchronization with the portable device 200 in response to the user command. The data management apparatus 100 is connected to the portable device 200 through a communication unit 130. The communication unit 130 may be a universal serial bus (USB) connection unit, which is widely used for communication with portable devices. However, the communication unit 130 is not limited to the USB connection unit, and any other communication device may be used as the communication unit 130.

Figure 2:
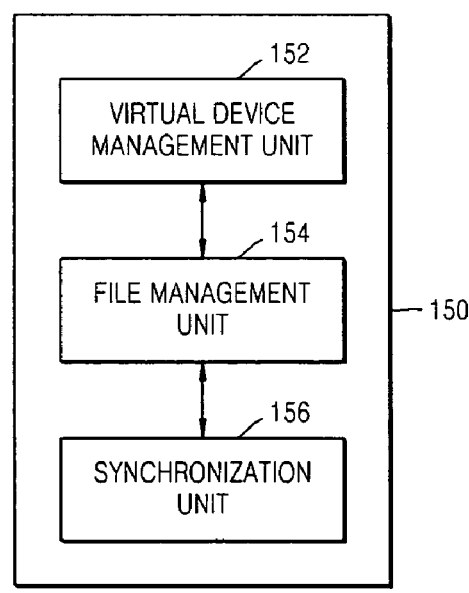
FIG. 2 is a block diagram of a control unit according to an embodiment of the present invention.

FIG. 2 is a block diagram of the control unit 150 of FIG. 1. As shown in FIG. 2, the control unit 150 includes a virtual device management unit 152, a file management unit 154, and a synchronization unit 156. The virtual device management unit 152 generates a virtual device in the storage unit 140 in response to a user command and manages, i.e., deletes or updates, the generated virtual device. The file management unit 154 manages content files in the virtual device in response to a user command. That is, the file management unit 154 stores content files or information on the content files, which is used to transmit the content files from the storage unit 140 to the virtual device, in the virtual device and manages, i.e., deletes or updates, the content files belonging to the virtual device. The synchronization unit 156 synchronizes data of the portable device 200 with data of the virtual device 100 via the communication unit 130.

The virtual device, according to an embodiment of the present invention, refers to a storage area to store information, such as a unique name, a model name of a relevant portable device, a maximum storage capacity of the virtual device, and information on transmitted content files. The virtual device may be a folder, a file, or a database in the storage unit 140 of the data management apparatus 100.

Where the virtual device is a folder, a folder having the same name as the virtual device may be generated, and information on actual storage locations and properties of transmitted content files is stored in the generated folder. Thus, management of the content files may be made easier if a link file for each content file is generated and stored in the folder acting as the virtual device. The link file may include information on characteristics of a corresponding content file, such as an actual storage location, a title, and size. Further, the link file may maintain information and information relating to characteristics of the corresponding content file. This is due to the fact that information relating to characteristics of the link file, stored in the folder, is automatically modified by an operating system (OS) when a user modifies an actual location or information of the corresponding content file. Where the virtual device is a file, a file having the same name as the virtual device may be generated, and information on transmitted content files is stored in the generated file. Where the virtual device is to be a database, a database having the same name as the virtual device is generated, and information on transmitted content files, such as an index table, a title, and size, is continuously stored in the generated database and managed. Information stored in the virtual device is used to search for a content file in a synchronization operation.

Figure 3:
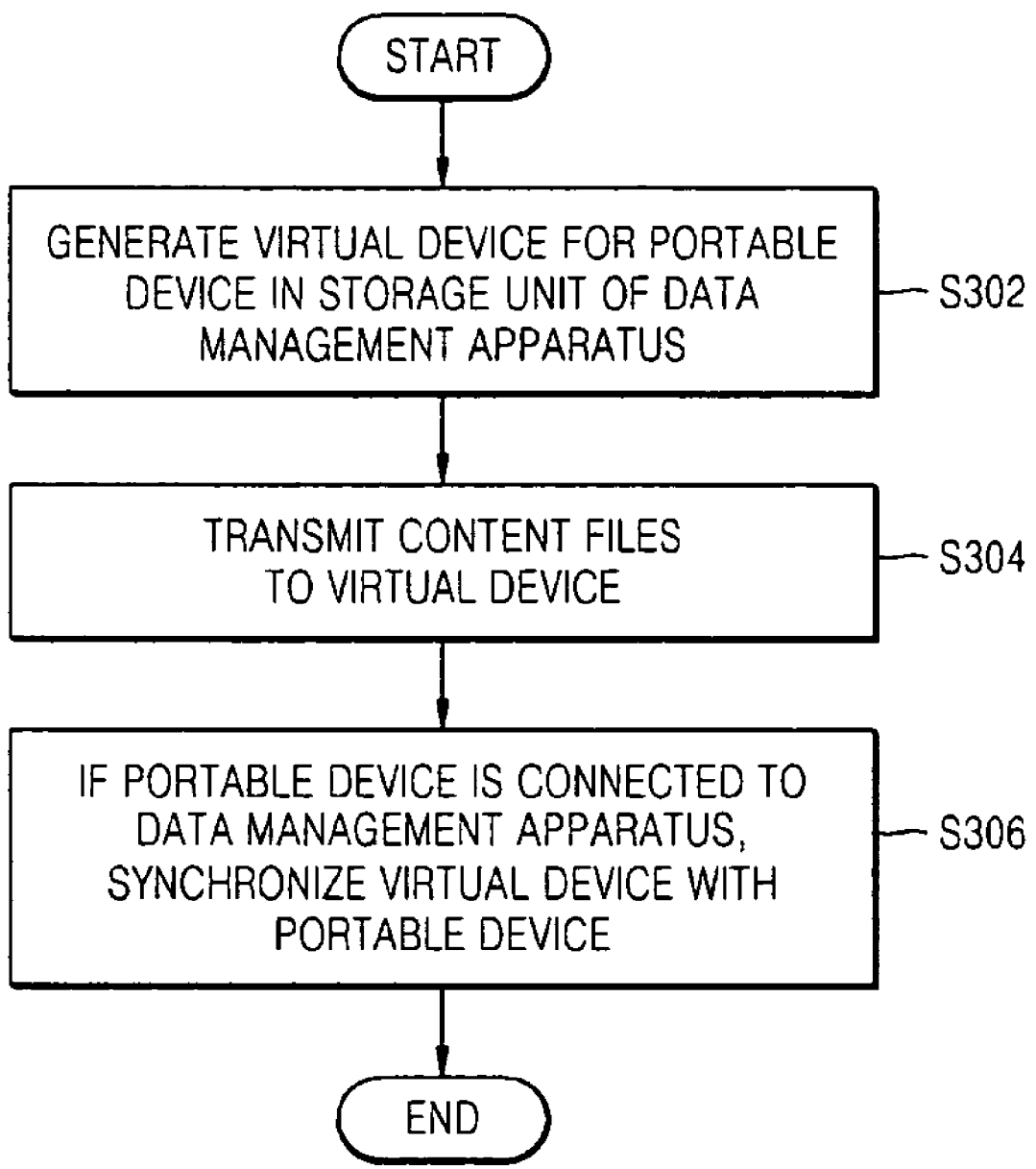
FIG. 3 is a flowchart illustrating a method of managing data of a portable device according to an embodiment of the present invention.

FIG. 3 is a flowchart illustrating a method of managing data of a portable device according to an embodiment of the present invention. As shown in FIG. 3, in operation S302, a virtual device corresponding to a portable device to be managed is generated. In operation S304, content files selected by a user among content files stored in the storage unit 140 of the data management apparatus 100 are transmitted to the generated virtual device. Here, content files stored in a remote content server that are accessible from the data management apparatus 100 may be transmitted to the generated virtual device. In order to transmit the content files, information on the content files, such as the locations of the content files, may be stored in a storage area corresponding to the virtual device.

However, on some occasions, the content files may initially need to be modified. If a data format of a content file to be transmitted is not supported by the portable device, the content file, to be transmitted, is converted to a data format that is supported by the portable device. The content file is then transmitted to the virtual device.

In addition, when the virtual device is generated, it is necessary to continuously monitor whether a capacity overflow occurs by comparing an assigned capacity of the virtual device to the total amount of capacity required by the transmitted content files. This prevents the size of content files to be transmitted from exceeding the capacity of the portable device.

Referring still to FIG. 3, when the portable device is sensed to have been connected to the data management apparatus 100, or when the user inputs a synchronization command, the virtual device is synchronized with the portable device in operation S306. Here, it is noted that the term, "synchronization" refers to an operation in which the content files belonging to the virtual device are transmitted to the portable device and copied with reference to the information stored in the virtual device.

Figure 4:
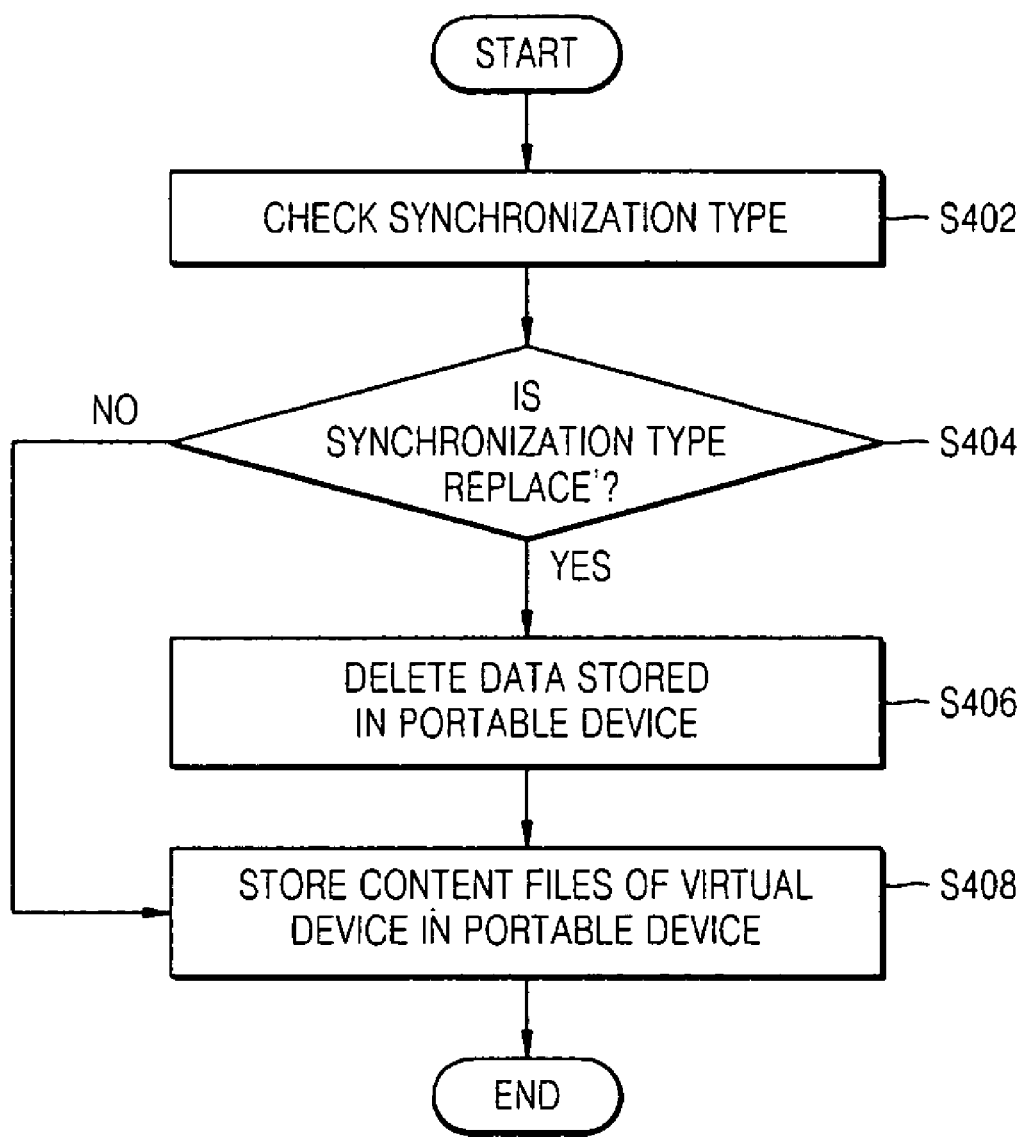
FIG. 4 is a flowchart illustrating a method of synchronizing a virtual device and a portable device according to an embodiment of the present invention.

FIG. 4 is a flowchart illustrating a method of synchronizing a virtual device and a portable device according to an embodiment of the present invention. As shown in FIG. 4, synchronization may be classified into either a 'replace' type of synchronization or an 'add' type of synchronization, which are user selectable options. In operation S402, the selected type of synchronization is checked. If the type of the synchronization is the 'replace' type of synchronization, in operation S404, data stored in the portable device is deleted in operation S406. Content files belonging to the virtual device are stored in a storage unit of the portable device in operation S408. If the type of the synchronization is the 'add' type of synchronization, in operation S404, the files belonging to the virtual device are stored in a storage unit of the portable device without deleting other files in the storage unit of the portable device in operation S408. Data communication with the portable device, which is required for the synchronization, and transmission of an operational command to the portable device are performed based on a communication protocol between the data management apparatus 100 and the portable device.

Figure 5:
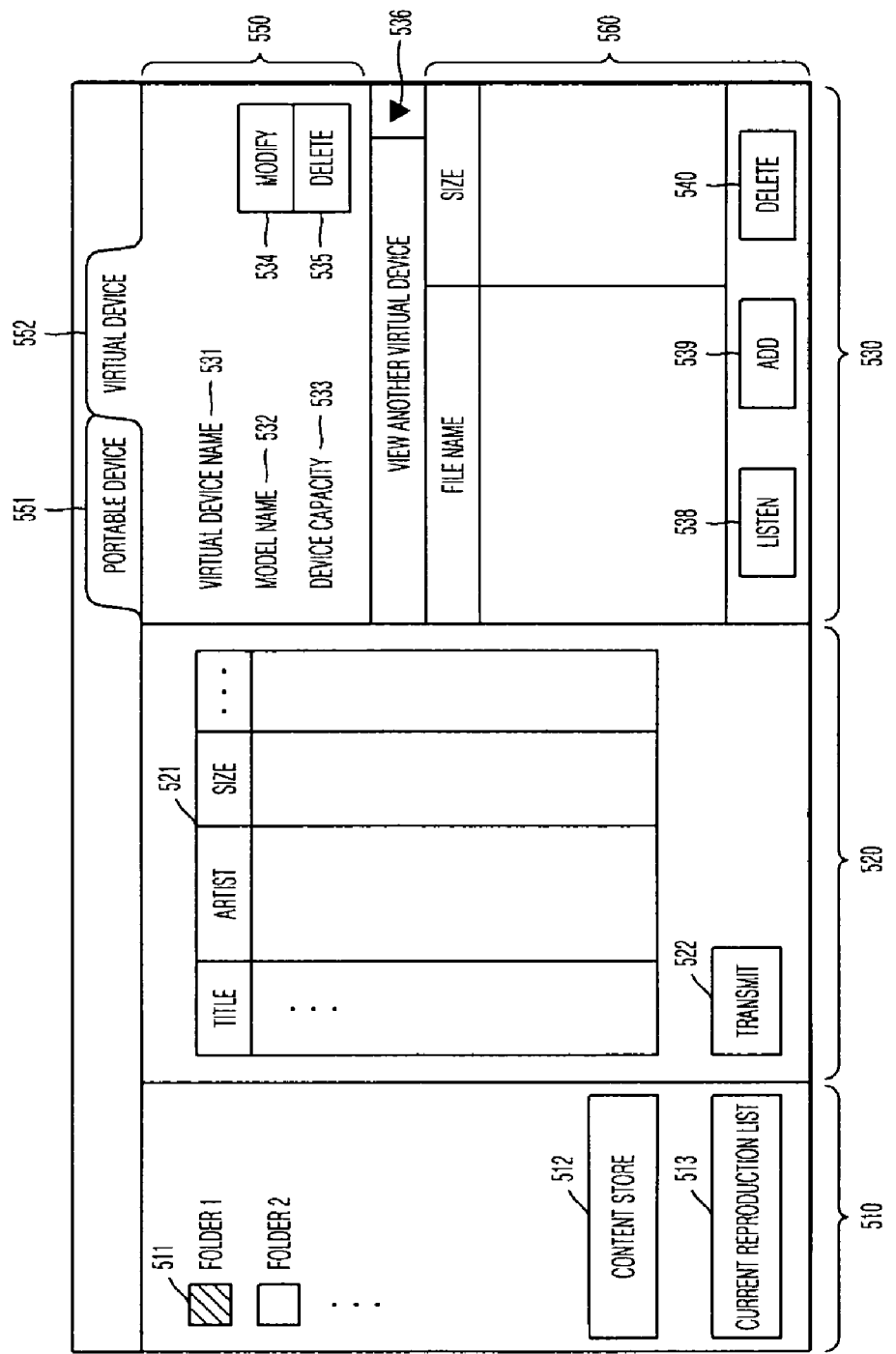
FIG. 5 illustrates a user interface screen to allow for a management of data of a portable device according to an embodiment of the present invention.

FIG. 5 illustrates a user interface screen to allow for a management of data of a portable device according to an embodiment of the present invention. As shown in FIG. 5, a user interface may include a first area 510 to allow for a browsing of content files included in a storage unit of a data management apparatus, a content storage or a reproduction list, a second area 520 to allow for a listing and a management of content files of a currently browsed source, and a third area 530 to allow for a browsing of content files stored in a virtual device or the portable device. A folder structure 511 of the storage unit of the data management apparatus is displayed in the first area 510, a list 521 of content files stored in a folder selected by a user is displayed in the second area 520, and information 550 on a virtual device and information 560 on content files transmitted to the virtual device are displayed in the third area 530. In the first area 510, a browsing interface for each category can be used instead of the folder structure 511. If the 'content storage' 512 is selected in the first area 510, a content file list of a content supply server (not shown) that is accessible from the data management apparatus is displayed in the second area 520, and if the 'current reproduction list' 513 is selected in the first area 510, a content file list of a reproduction list set by the user is displayed in the second area 520. In the third area 530, the user is able to handle one of the portable device and the virtual device by selecting one of tabs 551 and 552, and the portable device and the virtual device may be displayed so that they can be visually distinguished. For example, when information on the virtual device is displayed, a product image of the portable device is displayed in black and white so that the user is able to easily recognize that the virtual device is displayed.

Figure 6:
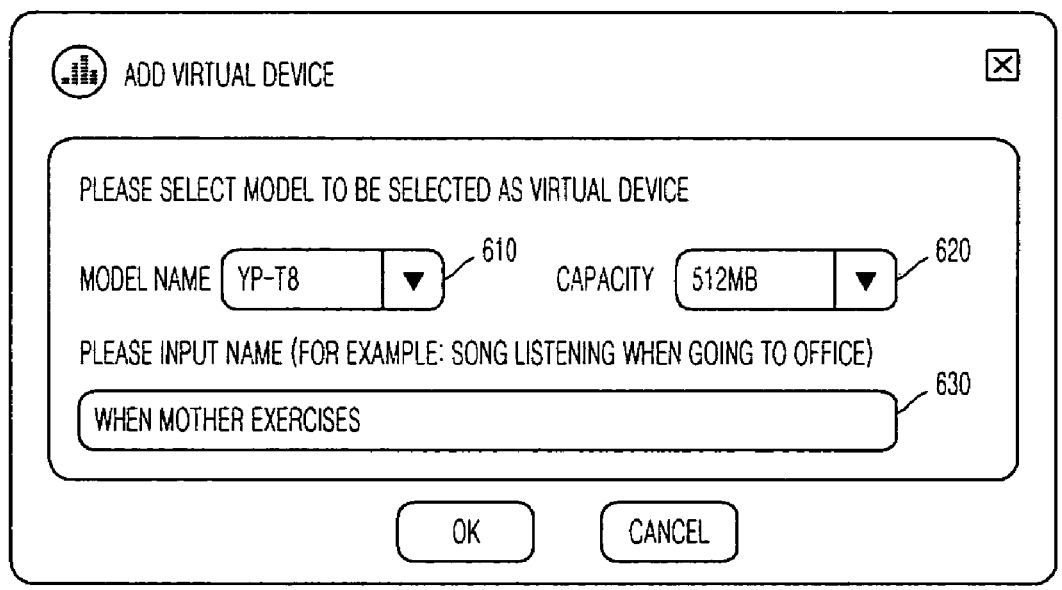
FIG. 6 illustrates a screen to allow for a generation of a virtual device according to the embodiment of FIG. 5.

FIG. 6 illustrates a screen to allow for a generation of a virtual device according to an embodiment of the present invention. As shown in FIG. 6, information used to generate the virtual device, including a model name of a portable device to be managed using the virtual device, a desired capacity of the virtual device, and a name to identify the virtual device, is input. When the portable device is connected, a virtual device having the same properties as the portable device may be generated by an automatic sensing of the properties of the portable device, such as a unique ID, a name, total capacity and currently used capacity of the portable device, a data storage structure of the portable device, reproducible file types of the portable device, and a digital rights management (DRM) policy. This property information is then stored in the virtual device. Thus, when the portable device is connected, an automatically obtained model name may be automatically input, and the capacity of the portable device may be sensed so that a user is prevented from inputting an amount of data that exceeds the sensed capacity. If the user selects an 'OK' button after an input of information, a storage area for the virtual device having the input information is assigned. The information on the virtual device is stored in the storage area in a metadata form. As is described above, a folder, a database, or a file having the same name as the virtual device is then generated.

The information on the generated virtual device is displayed in the third area 530 of FIG. 5. Referring back to FIG. 5, information on a name 531 of a virtual device currently selected by the user, a model name 532 of a portable device corresponding to the virtual device, and capacity 533 of the virtual device are displayed in the portion 550 of the third area 530. In addition, buttons 534 and 535 to allow for a modification and a deletion of the virtual device are displayed. A plurality of virtual devices may be generated for a single portable device, and a menu 536 to allow for a selection of a virtual device to be managed among the plurality of virtual devices is provided as needed. A list of content files transmitted to a currently selected virtual device is displayed in another portion 560 of the third area 530, which is located below the portion 550.

Figure 7:
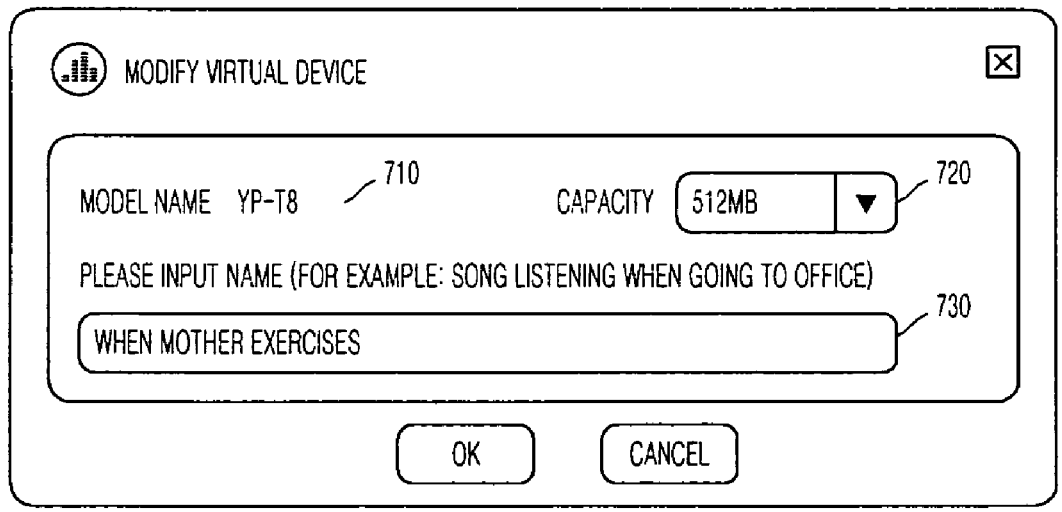
FIG. 7 illustrates a screen to allow for a modification of a virtual device according to the embodiment of FIG. 5.

FIG. 7 illustrates a screen to allow for a modification of the virtual device according to an embodiment of the present invention. As shown in FIG. 7, the capacity 720 and the name 730 of a virtual device may be modified by a user. However, according to an embodiment of the invention, a model name 710, which is selected when the virtual device is generated, is not to be modified because content files transmitted to the virtual device may be converted to match a portable device corresponding to the model name 710. Considering that the data capacity of a portable device can be upgraded, the capacity 720 of the virtual device may be modified by the user. The user also may delete an unnecessary virtual device.

Figure 8:
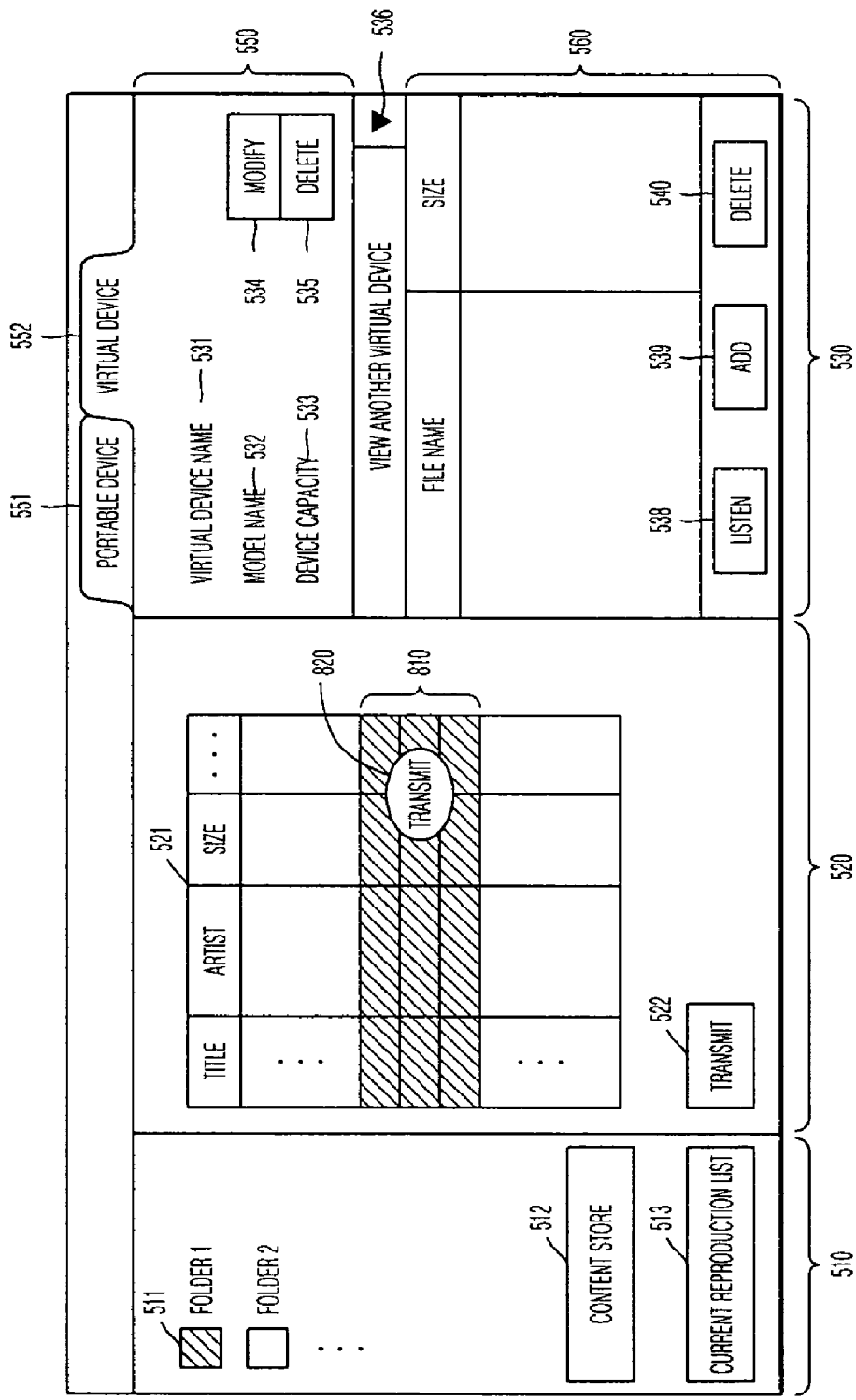
FIG. 8 illustrates a screen to allow for a transmittance of content files to a virtual device according to the embodiment of FIG. 5.

FIG. 8 illustrates a screen to allow for a transmittance of content files to a virtual device according to an embodiment of the present invention. As shown in FIG. 8, if a user pushes a 'transmit' button 522 after selecting desired content file(s) 810 from the content file list 521 of FIG. 5, information on the selected content file(s) 810 is stored in the virtual device, and the information on the virtually transmitted content file(s) 810 will be displayed in the area (file list) 560 of the third area 530. According to an embodiment of the invention, a quick button 820, which may be selected so as to conveniently initiate a transmittance of the content file(s) 810, may be displayed as soon as the content file(s) 810 are selected. The quick button 820 will be described later.

If a transmitted content file exceeds the capacity input by the user when the virtual device was generated, or, when a real portable device, whose capacitance is exceeded, is used, the user may be informed that the content file cannot be transmitted. In this situation, to manage content files belonging to the virtual device, a 'listen' button 538, an 'add' button 539, and a 'delete' button 540 may be used. The 'listen' button 538 is used to reproduce a content file selected from the file list 560, the 'add' button 539 is used to select a content file stored in the storage unit 140 of the data management apparatus 100 and to transmit the selected content file to the virtual device, and the 'delete' button 540 is used to delete a content file, which is selected from the file list 560, from the virtual device. As is described above, the user may manage data of a portable device using a virtual device in the same manner as the portable device.

FIG. 9 illustrates a screen to allow for a synchronization of a virtual device and a portable device according to an embodiment of the present invention. As shown in FIG. 9, the synchronization is performed in a state where information is displayed on the portable device by a selection of the portable device tab 551. If a 'synch' button 931 is clicked, a synchronization screen 900 is displayed. The synchronization screen 900 may be automatically displayed when the portable device is connected to the data management apparatus 100. In this case, a model name of the connected portable device may be obtained, and a list of virtual devices having the same model name may also be displayed. Another implementation is that information on a default virtual device is pre-set in the storage unit 140 of the data management apparatus 100, and when the portable device is connected, content files belonging to a virtual device corresponding to the default virtual device are transmitted to the portable device and copied. A user may directly select a virtual device 910 to be synchronized with the portable device from the synchronization screen 900. As is described above, a synchronization type 920 allows the user to select whether files currently stored in the portable device are deleted.

Figure 10A:
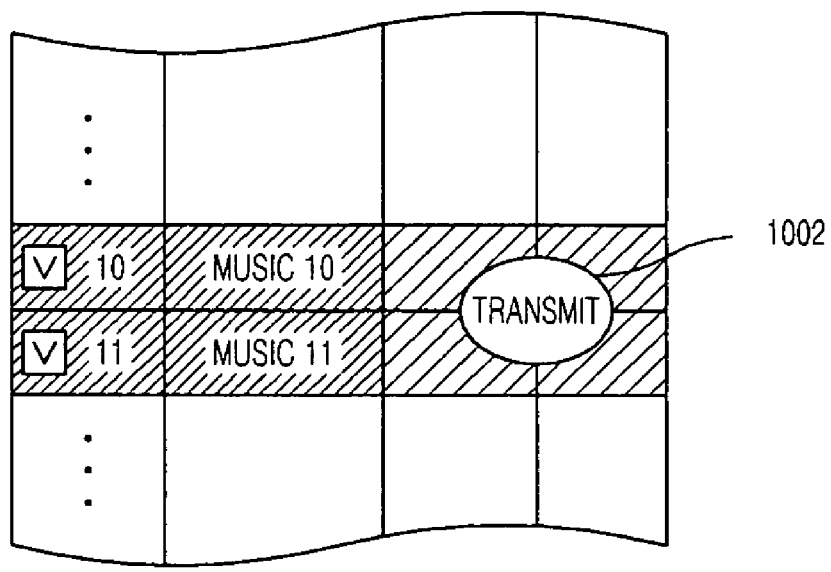
FIGS. 10A through 10C are diagrams of quick buttons used in a user interface method according to the embodiment of FIG. 5.
Figure 10B:
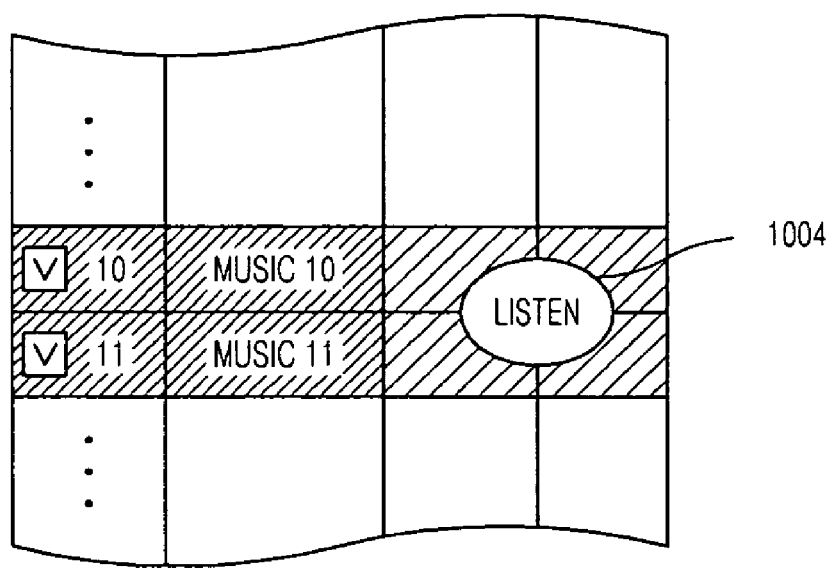
Figure 10C:
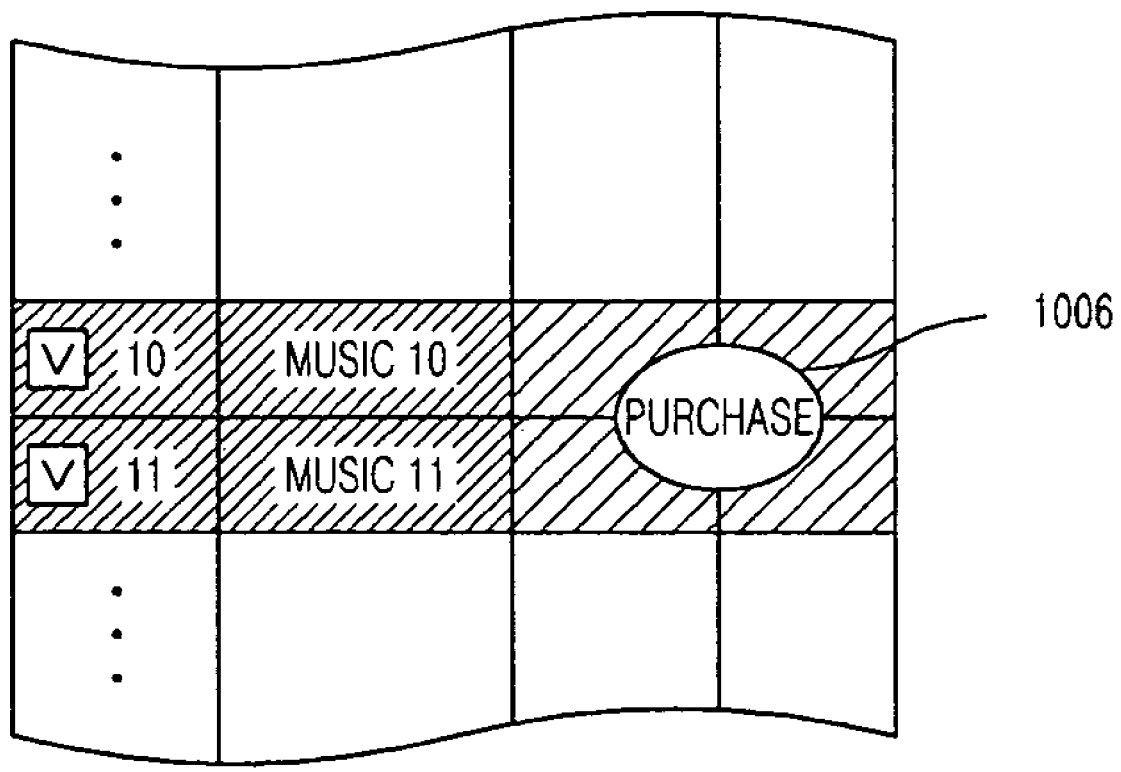

FIGS. 10A through 10C are diagrams of quick buttons to be used in a user interface method according to embodiments of the present invention. A quick button is a button displayed automatically by determining a function having the highest possibility to be used in a screen. For example, if a user selects at least one content file from a content file list displayed on the screen, a quick button connected to a predetermined function corresponding to properties of the content file list is automatically displayed on the screen.

As an example, FIG. 10A provides an illustration of a 'transmit' quick button 1002. As shown in FIG. 10A, when the user browses through the storage unit 140 of the data management apparatus 100, files that are selected by the user are stored in the storage unit 140 of the data management apparatus 100. The 'transmit' quick button 1002 to allow for a transmittance of the selected content files to a virtual device that is selected in a current screen is then automatically displayed.

As another example, FIG. 10B provides an illustration of a 'listen' quick button 1004. As shown in FIG. 10B, when the user uses the 'current reproduction list' 513 of FIG. 5, content files that are selected by the user are included in a reproduction list. The 'listen' quick button 1004 to allow for a reproduction of the selected content files is then automatically displayed.

As yet another example, FIG. 10C provides an illustration of a 'purchase' quick button 1006. As shown in FIG. 10C, when the user uses the 'content store' 512 of FIG. 5, content files that are selected by the user are stored in a content server (not shown) connected to the data management apparatus 100 via a network. The 'purchase' quick button 1006 to allow for a purchase of the selected content files is then automatically displayed.

The above-described method according to an embodiment of the present invention may also be embodied as computer readable codes on a computer readable recording medium.

As is described above, according to aspects of the present invention, by introducing a virtual device concept, since an interface is provided as if a portable device is connected even in a state where the portable device is not connected to a PC, data may be managed as if the portable device is connected. In addition, since files stored in a virtual device are automatically transmitted to the portable device when the portable device is connected, data of the portable device can be quickly updated.

In addition, when the portable device is connected to the PC, since the interface allows a user to copy files of a virtual device to be synchronized to the portable device by automatically displaying a list of virtual devices having the same model name as the portable device, even a user who is not adept at operating a PC may use the interface relatively easily. Moreover, since such a user is able to receive files of a virtual device pre-generated for PC novices by a user who is adept at operating a PC, the user is able to use the portable device without difficulty.

In addition, when a plurality of users use a single portable device, each user may previously generate an exclusive virtual device without the portable device, and when the portable device is available, the user may immediately receive files of the virtual device, which makes using the portable device more convenient.

In addition, a user may select whether the files of a virtual device are to replace the files of a portable device (i.e., the files of the portable device are deleted) or are added to the files of the portable device.

In addition, an intuitive and convenient interface is provided for a user to easily perform a desired function using a quick button.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of managing data of a portable device, the method comprising:
    generating a virtual device corresponding to the portable device in a storage unit of a data management apparatus;
    transmitting information on at least one content file to the virtual device and storing the information on the at least one content file in the virtual device; and
    if the portable device is connected to the data management apparatus, synchronizing the portable device with the virtual device by transmitting the at least one content file to the portable device with reference to the information stored in the virtual device,
    wherein the at least one content file is stored separately from the virtual device in at least one of the storage unit and a content server remote from the data management apparatus, the information on the at least one content file comprises a storage location of each of the at least one content file, and the synchronizing of the portable device with the virtual device comprises searching the at least one content file based on the storage location of each of the at least one content file and transmitting the at least one content file to the portable device.

2. The method according to claim 1, wherein the generating of the virtual device comprises assigning a storage area for the virtual device to the storage unit of the data management apparatus.

3. The method according to claim 2, wherein the generating of the virtual device further comprises storing a model name of the portable device, the maximum capacity of the virtual device, and a name of the virtual device in the storage area for the virtual device.

4. The method according to claim 3, wherein the synchronizing of the portable device with the virtual device comprises:
    if the portable device is connected to the data management apparatus, displaying a list of virtual devices having the same model name as the model name of the portable device;
    receiving a selection of a user of a virtual device to be synchronized from the virtual device list; and
    storing at least one content file belonging to the selected virtual device in a storage unit of the portable device.

5. The method according to claim 1, wherein the generating of the virtual device comprises generating a database for the virtual device, and the transmitting of the information on the at least one content file to the virtual device comprises storing information on the at least one content file to be transmitted in the database.

6. The method according to claim 1, wherein the generating of the virtual device comprises generating a folder for the virtual device, and the transmitting of the information on the at least one content file to the virtual device comprises storing information on the at least one content file to be transmitted in the folder.

7. The method according to claim 6, wherein the storing of the information on the at least one content file to be transmitted in the folder comprises:
    generating at least one link file, including a storage location of each of the at least one content file to be transmitted; and
    storing the at least one link file in the folder.

8. The method according to claim 1, wherein the transmitting of the information on the at least one content file to the virtual device comprises:
    if a data format of the at least one content file to be transmitted is not supported by the portable device, converting the at least one content file to be transmitted to a type of a data format that is supported by the portable device; and
    storing information on the converted file in the virtual device.

9. The method according to claim 1, wherein the synchronizing of the portable device with the virtual device comprises:
    checking a pre-set type of synchronization;
    if the type of the synchronization is set to a 'replace' type of synchronization, deleting data stored in the storage unit of the portable device and storing the at least one content file belonging to the virtual device in the storage unit of the portable device; and
    if the type of the synchronization is set to an 'add' type of synchronization, additionally storing the at least one content file belonging to the virtual device in the storage unit of the portable device.

10. The method according to claim 1, wherein the generating of the virtual device comprises generating a plurality of virtual devices for the portable device, and the synchronizing of the portable device with the virtual device comprises storing at least one content file belonging to a default virtual device among the plurality of virtual devices in the storage unit of the portable device.

11. The method according to claim 1, wherein the information on the at least one content file further comprising a title and/or a size information of each of the at least one content file.

12. The method according to claim 1, further comprising modifying the information on the at least one content file when the at least one content file is modified.

13. An apparatus to manage data of a portable device, the apparatus comprising:
    a communication unit to transmit and/or receive data to and/or from the portable device;
    a storage unit to store a plurality of content files and at least one virtual device corresponding respectively to at least the portable device; and
    a control unit comprising:
        a virtual device management unit to generate a virtual device in the storage unit and to manage the generated virtual device;
        a file management unit to transmit information on at least one content file to the virtual device and to manage the information on the at least one content file; and
        a synchronization unit to synchronize the portable device with the virtual device, which corresponds to the portable device, via the communication unit,
    wherein the at least one content file is stored separately from the virtual device in at least one of the storage unit and a content server remote from the data management apparatus, the information on the at least one content file comprises a storage location of each of the at least one content file, and the synchronizing of the portable device with the virtual device comprises searching the at least one content file based on the storage location of each of the at least one content file and transmitting the at least one content file to the portable device.

14. The apparatus according to claim 13, wherein the virtual device comprises a database to store the information on the at least one content file transmitted by the file management unit.

15. The apparatus according to claim 13, wherein the virtual device comprises a folder to store the information on the at least one content file transmitted by the file management unit.

16. The apparatus according to claim 15, wherein the file information stored in the folder comprises at least one link file, including a storage location and properties of each of the at least one content file.

17. The apparatus according to claim 13, wherein, if a data format of the at least one content file to be transmitted is not supported by the portable device, the file management unit converts the at least one content file to be transmitted to a type of a data format that is supported by the portable device and stores information on the converted file in the virtual device.

18. The apparatus according to claim 13, wherein, if the portable device is connected to the apparatus, the synchronization unit transmits content files belonging to the virtual device to the portable device.

19. The apparatus according to claim 13, wherein the storage unit further stores information on a default virtual device, and the synchronization unit transmits content files belonging to a virtual device corresponding to the default virtual device to the portable device when the portable device is connected to the apparatus.

20. The apparatus according to claim 13, wherein, if a synchronization command is input, the synchronization unit transmits content files belonging to a selected virtual device to the portable device.

21. The apparatus according to claim 13, wherein the storage unit further stores synchronization type information, and the synchronization unit deletes data stored in the storage unit of the portable device and stores content files belonging to the virtual device in the storage unit of the portable device if the type of the synchronization is set to a 'replace' type of synchronization, and additionally stores the content files belonging to the virtual device in the storage unit of the portable device if the type of the synchronization is set to an 'add' type of synchronization.

22. The apparatus according to claim 13, wherein the virtual device management unit generates a virtual device, to which a storage area to store a model name of the portable device, the maximum capacity of the virtual device, and a name of the virtual device, are assigned when a virtual device generation command is input.

23. The apparatus according to claim 13, wherein the virtual device management unit deletes information on a selected virtual device from the storage unit when a virtual device deletion command is input and replaces information on the selected virtual device stored in the storage unit with information input when a virtual device replacement command is input.

24. A user interface method to generate a virtual device, which stores information on a portable device and information on at least one content file, in a storage unit of a data management apparatus and to manage data of the portable device using the virtual device, which corresponds to the portable device, the user interface method comprising automatically displaying a quick button connected to a predetermined function corresponding to properties of a content file list, if a user selects at least one content file from the content file list displayed on a screen, wherein if the displayed content file list is a list of content files stored in the storage unit of the data management apparatus, the quick button is used to transmit information on the at least one selected content file to a virtual device selected from the screen, wherein the at least one content file is stored separately from the virtual device in at least one of the storage unit and a content server remote from the data management apparatus, the information on the at least one content file comprises a storage location of each of the at least one content file, and the synchronizing of the portable device with the virtual device comprises searching the at least one content file based on the storage location of each of the at least one content file and transmitting the at least one content file to the portable device.

25. The user interface method according to claim 24, wherein if the displayed content file list is a list of content files included in a reproduction list set by the user, the quick button is used to reproduce the at least one selected content file.

26. The user interface method according to claim 24, wherein if the displayed content file list is a list of content files stored in a content server connected to the data management apparatus via a network, the quick button is used to purchase the at least one selected content file.

27. The user interface method according to claim 24, further comprising displaying the portable device and the virtual device to be identified on the screen.

28. A method of managing data of a portable device for use with a data management apparatus not initially connected to the portable device, the method comprising:

generating a stored virtual device, corresponding to the portable device, for reference by the portable device in the data management apparatus;

transmitting information on a content file to the virtual device and storing the information on the content file in the virtual device; and synchronizing the portable device with the virtual device by transmitting the content file to the portable device with reference to the stored information when the portable device is connected to the data management apparatus, wherein the content file is stored separately from the virtual device in at least one of the storage unit and a content server remote from the data management apparatus, the information on the at least one content file comprises a storage location of each of the at least one content file, and the synchronizing of the portable device with the virtual device comprises searching the at least one content file based on the storage location of each of the at least one content file and transmitting the at least one content file to the portable device.

29. The method according to claim 28, wherein, if the content file comprises a plurality of individual files, each of which is selected simultaneously by a user, the synchronization operation comprises generating a quick button to allow for an execution of the transmittance of the content file.

30. An apparatus, including a storage unit, to manage a transmittance of data to and/or from a portable device, the apparatus comprising:

a virtual device management unit to generate a virtual device corresponding to the portable device in the storage unit;

a file management unit to transmit information on a content file from the storage unit to the virtual device and to store the information on the content file in the virtual device; and a synchronization unit to synchronize the portable device with the virtual device with reference to the stored information when the portable device and the apparatus are connected such that the content file is transmitted to the portable device, wherein the content file is stored separately from the virtual device in at least one of the storage unit and a content server remote from the data management apparatus, the information on the at least one content file comprises a storage location of each of the at least one content file, and the synchronizing of the portable device with the virtual device comprises searching the at least one content file based on the storage location of each of the at least one content file and transmitting the at least one content file to the portable device.

31. The apparatus according to claim 30, wherein, if the content file comprises a plurality of individual files, each of which is selected simultaneously by a user, the synchronization unit generates a quick button to allow for an execution of the transmittance of the content file.

32. A computer readable recording medium excluding transitory signal transmission medium having a stored instruction set to generate a user interface with a computer to facilitate a management of data of a portable device, the interface allowing for a generation and modification of a virtual device corresponding to the portable device in the computer, the virtual device containing information on at least one content file, and a transmission of the at least one content file to the portable device with reference to the information on the at least one content file when the portable device is connected to the computer or upon a predetermined input from a user of the computer, wherein the at least one content file is stored separately from the virtual device in at least one of a storage unit and a content server remote from the data management apparatus, the information on the at least one content file comprises a storage location of each of the at least one content file, and the synchronizing of the portable device with the virtual device comprises searching the at least one content file based on the storage location of each of the at least one content file and transmitting the at least one content file to the portable device.

* * * * *